(12) United States Patent
Schroeder et al.

(10) Patent No.: US 6,477,784 B2
(45) Date of Patent: Nov. 12, 2002

(54) COORDINATE MEASURING MACHINE HAVING A NON-SENSING PROBE

(75) Inventors: Mario Schroeder, Püttlingen (DE); Frank Brossette, Schmelz (DE); Stefan Hombach, Genviller (FR)

(73) Assignee: Mycrona GmbH, Saarwellingen (DE)

( * ) Notice: Subject to any disclaimer, the term of this patent is extended or adjusted under 35 U.S.C. 154(b) by 0 days.

(21) Appl. No.: 09/841,514

(22) Filed: Apr. 24, 2001

(65) Prior Publication Data

US 2001/0022033 A1 Sep. 20, 2001

Related U.S. Application Data

(62) Division of application No. 09/335,211, filed on Jun. 17, 1999, now Pat. No. 6,240,651.
(60) Provisional application No. 60/105,109, filed on Oct. 21, 1998.

(30) Foreign Application Priority Data

Jun. 19, 1998 (DE) .......................... 198 26 641
Jun. 26, 1998 (DE) .......................... 198 28 701

(51) Int. Cl.$^7$ ............................ G01B 5/012; G01B 5/008
(52) U.S. Cl. ............................ 33/559; 33/503; 33/572
(58) Field of Search .................... 33/18.1, 503, 504, 33/505, 556, 557, 558, 559, 560, 561, 572, 701; 362/551, 572, 577

(56) References Cited

U.S. PATENT DOCUMENTS

| | | | | |
|---|---|---|---|---|
| 4,561,776 A | * | 12/1985 | Pryor | 356/72 |
| 4,566,829 A | * | 1/1986 | Johnson | 408/239 R |
| 4,574,199 A | * | 3/1986 | Pryor | 250/559.33 |
| 4,576,482 A | * | 3/1986 | Pryor | 356/612 |
| 4,642,897 A | | 2/1987 | Kirsch | |
| 4,667,231 A | * | 5/1987 | Pryor | 348/128 |
| 4,792,698 A | * | 12/1988 | Pryor | 250/559.23 |
| 4,839,526 A | * | 6/1989 | Pryor | 250/559.4 |
| 4,884,878 A | * | 12/1989 | Arenal et al. | 359/704 |
| 5,038,258 A | * | 8/1991 | Koch et al. | 362/237 |
| RE33,774 E | | 12/1991 | Gurny | |
| 5,179,786 A | * | 1/1993 | Shelton | 33/503 |
| 5,189,624 A | * | 2/1993 | Barlow et al. | 700/169 |
| 5,339,194 A | * | 8/1994 | Yates | 359/696 |

(List continued on next page.)

*Primary Examiner*—Diego Gutierrez
*Assistant Examiner*—R. Alexander Smith
(74) *Attorney, Agent, or Firm*—MacMillan, Sobanski & Todd, LLC

(57) ABSTRACT

A coordinate measuring machine including a support platform for supporting an object. Scanning means is supported by the support platform. The scanning means includes a probe assembly and a non-contact scanner. Drive means is connected to at least one of the probe assembly and the non-contact scanner for moving the probe assembly and non-contact scanner relative to each other. The probe assembly includes a probe movably disposed in a guide tube. The probe includes a shaft and a tip integrally formed from either a fiber-optic or non-fiber-optic material. The tip extends from the guide tube so as to be detectable by the non-contact scanner. The tip may include one or more stylus. During operation the tip contacts the object and the non-contact scanner detects the tip to determine the corresponding coordinates of the object. A light source illuminates the tip for improved detection of the tip. When the probe is formed of a fiber-optic material, light is emitted through the probe. When the probe is formed of a non-fiber-optic material, light is emitted through a fiber-optic ring disposed in the guide tube and surrounding the shaft. Dislodging means dislodges the tip from the object reducing the build up of static forces between the tip and the object. Cleaning means removes foreign particles from the tip. In the event that the tip breaks from the shaft, feeding means advances the shaft exposing the shaft to heating means. The heating means heats the corresponding the shaft to form a new tip.

7 Claims, 3 Drawing Sheets

U.S. PATENT DOCUMENTS

| | | | |
|---|---|---|---|
| 5,517,124 A | | 5/1996 | Rhoades et al. |
| 5,615,489 A | * | 4/1997 | Breyer et al. .................. 33/503 |
| 5,628,922 A | | 5/1997 | Chen |
| 5,669,743 A | * | 9/1997 | Johnson et al. ............... 408/56 |
| 5,757,496 A | * | 5/1998 | Yamazaki ................... 356/371 |
| 5,825,666 A | * | 10/1998 | Freifeld ...................... 702/153 |
| 5,834,645 A | * | 11/1998 | Bartels et al. ................. 73/105 |
| 5,958,148 A | * | 9/1999 | Holzapfel et al. ............ 134/18 |
| 6,154,972 A | * | 12/2000 | Otsubo ........................ 33/503 |
| 6,287,387 B1 | * | 9/2001 | Lee et al. ...................... 134/1 |
| 6,341,529 B1 | * | 1/2002 | Casati ......................... 73/796 |

* cited by examiner

COORDINATE MEASURING MACHINE HAVING A NON-SENSING PROBE

CROSS REFERENCE TO RELATED APPLICATION

This application is a divisional of the U.S. patent application Ser. No. 09/335,211 filed Jun. 17, 1999, that issued as the U.S. Pat. No. 6,240,651 on Jun. 5, 2001 which claims the benefit of provisional application No. 60/105,109 filed Oct. 21, 1998.

BACKGROUND OF THE INVENTION

This invention relates in general to a coordinate measuring machine. More specifically, this invention relates to a coordinate measuring machine having an image processor and a probe detectable by the image processor.

Conventional coordinate measuring machines used in measuring an object typically include a sensing probe mounted to a moveable spindle. The sensing probe includes a shaft interconnecting a sensor and a contact tip. In making a measurement, the spindle positions the probe to where the contact tip contacts the object, which causes the sensor to deflect. The sensor may be a measuring type sensor or a switching type sensor. The measuring type sensor measures displacement as a function of the deflection of the sensor, whereas the switching type sensor generates a switching signal upon the sensor deflecting a predetermined amount. The shaft of either sensing type probe must be sufficiently rigid to transmit the loading force on the contact tip to the sensor. However, this rigidity requirement places a limit on how small the shaft and contact tip can be, which in turn restricts how small of a measurement can be taken.

Various coordinate measuring machines having non-contact sensors, such as image processors and/or lasers, have been proposed that are capable of taking smaller measurements than a typical sensing probe. However, the non-contact sensors are not as well suited as a probe for making certain type measurements, such as measuring the internal surface of a cylinder.

Still other coordinate measuring machines having an image processor and a flexible non-sensing probe have been proposed. The image processor and non-sensing probe are arranged on a single spindle in a manner such that the non-sensing probe is detectable by the image processor. In making a measurement, the image processor detects the position of the non-sensing probe when the non-sensing probe is placed in contact with the intended measurement object. The non-sensing probe includes a shaft and contact tip integrally formed from a fiber-optic material. Because the shaft of the non-sensing probe need not exhibit load transfer capabilities, the size of non-sensing probe can be relatively small as compared to a typical sensing probe. Consequently, a coordinate measurement machine utilizing an image processor and non-sensing probe combination is capable of making smaller contact measurements than can a coordinate measurement machine utilizing a typical sensing probe. However, due to the brittle nature of the non-sensing probe, the shaft of the non-sensing probe is susceptible to breaking under normal use conditions. Consequently, the non-sensing probe may have to be replaced a number of times during the normal course of a measurement process. In replacing the non-sensing probe, the contact tip portion of the non-sensing probe must be positioned in the focus plane of the camera. The replacement of probe typically requires at least some form of manual support. Consequently, these types of machines generally cannot operate for lengthy periods of time without the need for operator assistance.

Another concern associated with the non-sensing probe is the build up of static forces between the contact tip portion of the non-sensing probe and the measurement object, which cause the contact tip to cling to the measurement object. This clinging phenomenon may cause the contact tip to break from the probe when attempting to separate the probe from the object.

Additionally, dust or other particles may stick to the contact tip, which may cause inaccuracies in the measurements taken.

Furthermore, because the non-sensing probe and image processor are mounted to a common spindle in a "fixed" relationship relative to one and other, it is difficult to hold the contact tip portion in focus when placing the contact tip in contact with the object. Also, it may be desirable to operate the image processor independent of the non-sensing probe when in making certain measurements. However, in order for the image processor to directly make a measurement of an object, the non-sensing probe must be removed from the spindle. The removal and the subsequent replacement of the non-sensing probe from and to the spindle add to the time and cost of the measurement operation.

One objective of this invention is to provide means for automatically repairing the non-sensing probe. Another objective of this invention is to provide means for cleaning the non-sensing probe. Additionally, it is an objective of this invention to provide means for dislodging the non-sensing probe from a measurement object. Furthermore, it is an objective of this invention to provide means for moving the non-sensing probe and image processor relative to one and other. Still further, it is an objective of this invention to reduce the likelihood of damage to the non-sensing probe while maintaining detection of the non-sensing probe by the image processor.

SUMMARY OF THE INVENTION

This invention concerns a coordinate measuring machine for measuring an object. The machine comprises a support platform for supporting the object. A non-contact scanner and a probe detectable by the non-contact scanner are supported by the support platform. The probe includes a shaft having a contact end portion. The contact end portion includes a tip for contacting the object. The tip may include at least one stylus for contacting the object.

The machine may further comprise heating means proximate the support platform for forming the tip by heat transferred from the heating means to the contact end portion.

Additionally, the machine may comprise cleaning means proximate the support platform for cleaning the tip.

Also, the machine may comprise dislodging means proximate the tip for dislodging the tip from the object.

Furthermore, the machine may comprise drive means connected to at least one of the non-contact scanner and the probe for moving the non-contact scanner and the probe relative to one and other.

The machine may also comprise a fiber-optic ring adapted for receiving light from a light source and proximate the probe for illuminating the tip, which better enables the non-contact scanner to detect the tip.

Preferably the probe is formed of a fiber-optic material. Alternatively, the probe may be formed of a suitable non-fiber-optic material.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
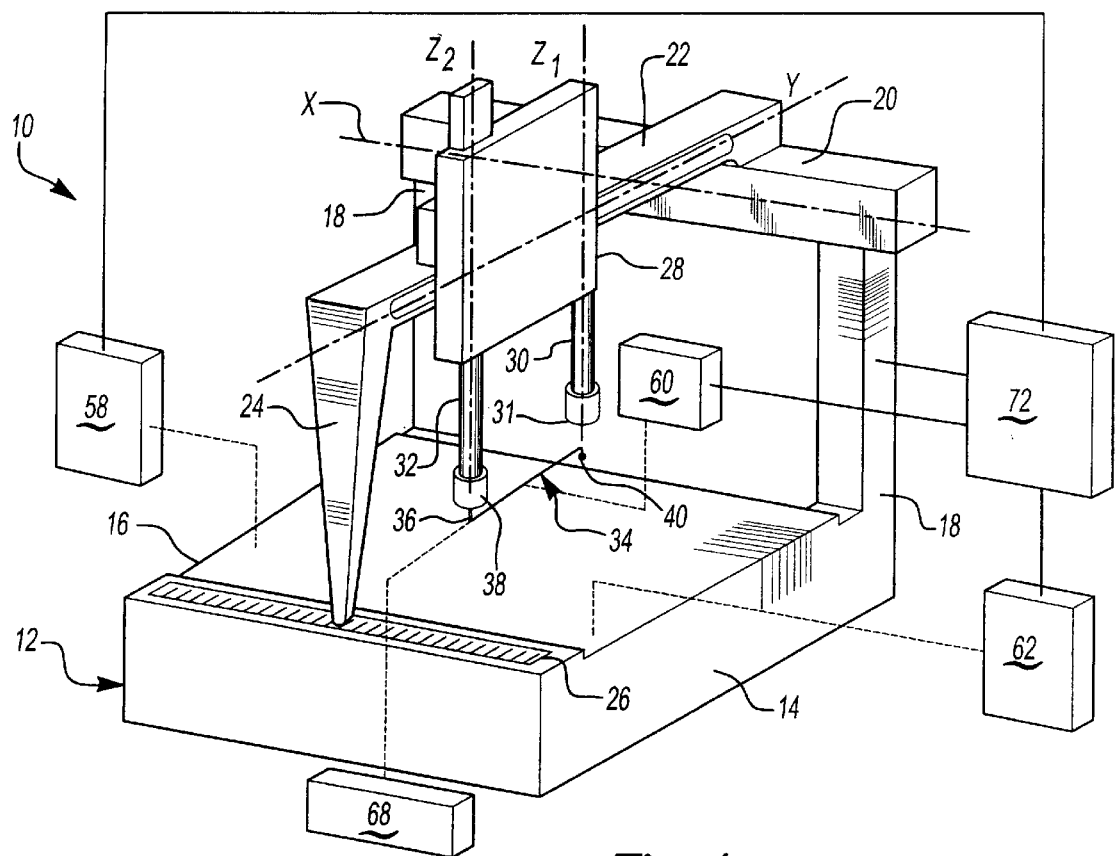
FIG. 1 is a perspective view of a coordinate measuring machine according to this invention.

A coordinate measuring machine according to this invention is shown generally at 10 in FIG. 1. The machine 10 comprises a support platform indicated generally at 12. The support platform 12 includes a base 14 having a flat surface 16 for mounting an object to be measured. Preferably, the flat surface 16 is positioned horizontally. Each of two opposing pillars 18 extends upwardly from a common side of the base 14. Each pillar 18 is perpendicular to the base 14. A cross-member 20, presenting a longitudinal axis or X-axis, interconnects the pillars 18 at upper ends.

The machine 10 further comprises a cross-carrier 22 presenting a longitudinal axis or Y-axis perpendicular to the X-axis. One end of the cross-carrier is movably mounted to the cross-member 20 for movement parallel to the X-axis. A post 24 extending downwardly from the other end of the cross-carrier 22 is movably supported in a guide track 26 formed in the base 14 parallel to the cross-member 20 for movement parallel to the X-axis.

The probe assembly 34 includes a probe holder 36 having a proximal end removably mounted to the probe spindle 32. Preferably, the proximal end of the probe holder 36 is of a well-known configuration such that the probe holder 36 can be placed in a standard probe changer (not shown), such a RENISHAW® probe changer, when the probe assembly 34 is not in use. The probe assembly 34 further includes a guide tube 38 having a proximal end attached to a distal end of the probe holder 36. The guide tube is generally L-shape with a portion of the guide tube 38 adjacent the proximal end of the guide tube 38 being held in a generally horizontal orientation, and an adjoining portion of the guide tube 38 being turned downward. A probe 40 is disposed in and extends from the guide tube 38.

Figure 2:
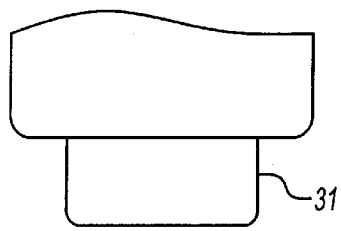
FIG. 2 is an enlarged sectional view of a portion of the probe assembly shown in FIG. 1.
Figure 2:
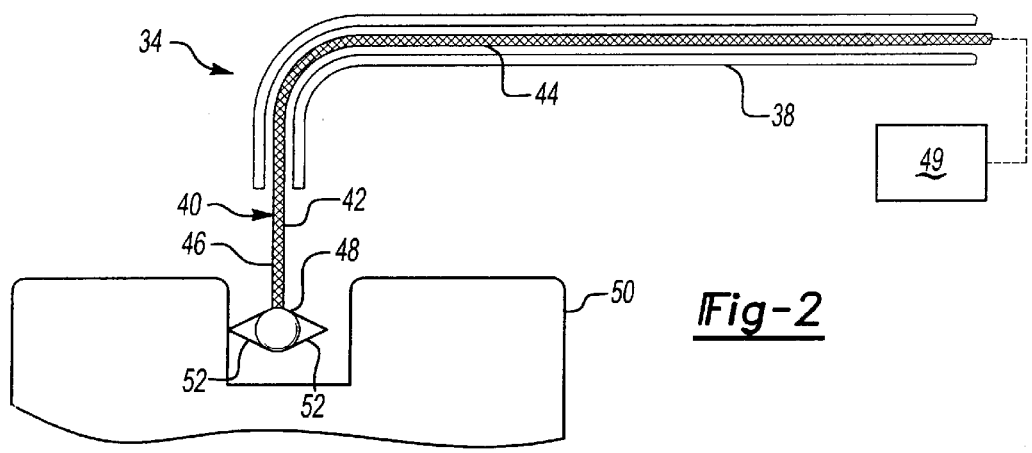

FIG. 2 shows a portion of the probe assembly 34 in greater detail. The probe, indicated generally at 40, includes a shaft 42 having a supply portion 44 and a contact end portion 46. The supply portion 44 is movably disposed in the guide tube 38 with the contact end portion 46 extending from a distal end of the guide tube 38. In addition to supporting the probe 40, the guide tube 38 acts as supply means for storing the supply portion 44, the importance of which will be discussed below. A tip 48 is integrally formed from the contact end portion 46 for contacting a measurement object 50. Preferably, the probe 40 is formed of a fiber-optic material, such as glass. Alternatively, the probe 40 may be formed of any suitable material such as plastic, metal or the like. The length of the guide tube 38 is such that the tip 48 is positioned so as to be detectable by the image processor 31. The tip 48 is preferably spherical, but may be any shape recognizable by the image processor 31, such as disc-shaped, conical or the like. Additionally, the tip 48 may include one or more stylus 52 (two shown) for increasing the measuring sensitivity capability of the probe 40. In order for the tip 48 to be detectable by the image processor, the shaft 42 has a maximum shaft area perpendicular to the longitudinal axis of the shaft 42 less than a maximum tip area of the tip 48 parallel to the maximum shaft area.

The probe assembly 34 may further include feeding means 49 of any well-known type for incrementally advancing the supply portion 44 of the shaft 42 toward the proximal end of the guide tube 38. The feeding means 49 is useful in the event that the tip 48 becomes damaged or separated from the shaft 42. The operation of the feeding means is discussed in greater detail below.

Figure 3:
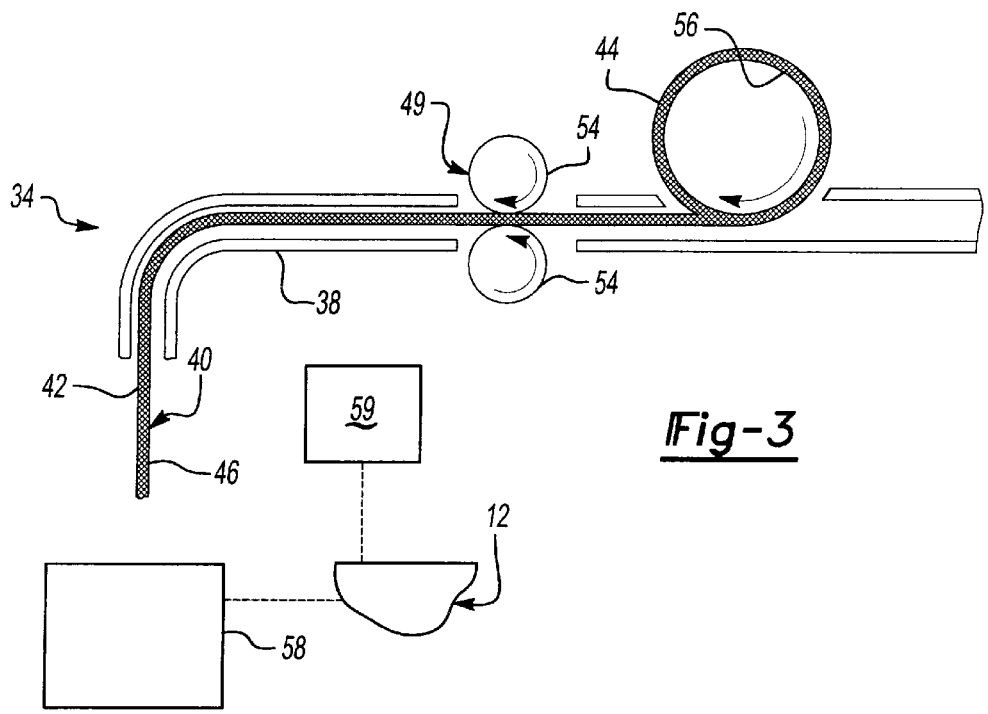
FIG. 3 is an enlarged sectional view of a portion of the probe assembly shown in FIG. 1 illustrating the relationship between the probe assembly and the heating means shown in FIG. 1 when forming a tip of the probe assembly.

FIG. 3 shows the feeding means 49 as including a pair of opposing drive wheels 54 rotatably supported relative to the guide tube 38. Preferably, one of the drive wheels 54 is adapted for connection to a suitable drive motor or the like (not shown). Alternatively, the drive motor may drive each of the drive wheels 54. The supply portion 44 of the shaft 42 engages a portion of the perimeter of each of the drive wheels 54. The frictional force between the shaft 42 and the drive wheels 54 is sufficient to advance the shaft 42 when the drive motor rotates the drive wheels 54. Alternatively, the feeding means 49 may included a clamping device (not shown), screw device (not shown) or a piston device (not shown) arranged in relationship with the supply portion 44 such that the shaft 42 is advanced toward the proximal end of the guide tube 38 upon actuation of the associated clamping device, screw device or piston device.

The probe assembly 34 may further include supply means for storing a portion of the supply portion 44 of the shaft 42 that exceeds the length of the guide tube 38, such as a spool 56 rotatably supported relative to the guide tube 38 as shown in FIG. 3.

Referring to FIGS. 1 and 3, the machine 10 further comprises heating means 58 for forming the tip from the contact end portion of the shaft. Preferably, the heating means 58 includes any well-known radiant heat source (not shown) for transferring heat to the contact end portion 46. The heating means 58 is supported by or relative to the support platform 12 such that the contact end portion 46 can be positioned proximate to the heating means 58. The heating means 58 may further include a heated mold (not shown), shaped consistent with the desired shape of the tip 48, for transferring heat to the contact end portion 46 when placed in contact with the contact end portion 46.

Additionally, the machine 10 may include cutting means 59, as shown in FIG. 3, of a well-known type such as a scissor-like device (not shown) for cutting the shaft 42 adjacent to the proximal end of the guide tube 38. The cutting means 59 is illustrated as being mounted relative to the support platform 12, but may be made part of the probe assembly 34. The shaft 42 may be cut either prior to or after the feeding means 49 advances the shaft 42 but prior to forming the tip 48. The purpose for cutting the shaft 42 is to position the contact end portion 44 a predetermined distance from the heating means 58 when forming the tip 48.

Figure 4:
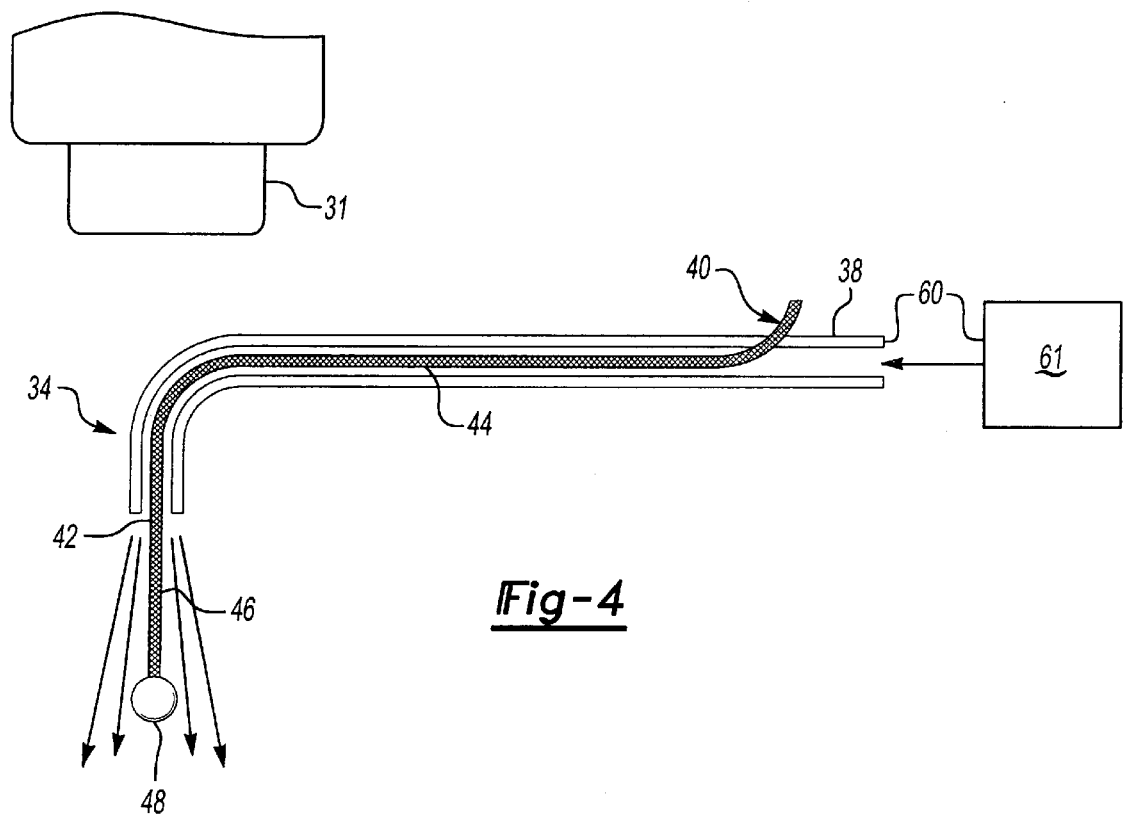
FIG. 4 is an enlarged sectional view of a portion of the probe assembly illustrating a compressed air source in communication with the probe assembly.

Referring to FIGS. 1 and 4, the machine 10 may further include dislodging means 60 for dislodging the tip 48 from a measurement object. Preferably, the dislodging means 60 includes a compressed air source 61 placed in fluid communication with the guide tube 38.

Figure 5:
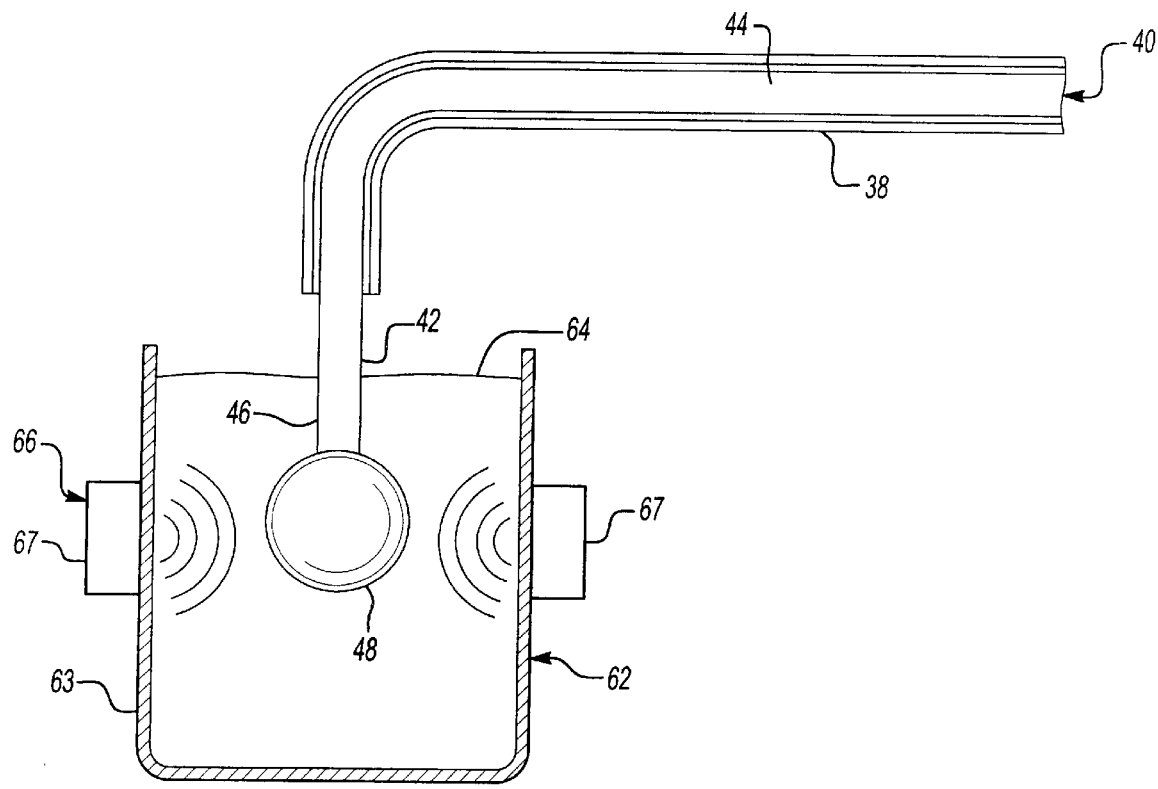
FIG. 5 is an enlarged sectional view of the portion of a probe assembly shown in FIG. 1 illustrating the relationship between the probe assembly and a rinsing bath when cleaning the tip of the probe assembly.

Referring to FIGS. 1 and 5, the machine 10 may further include cleaning means 62 for removing dust or other particulate from the tip 48 between measurements. Preferably, the cleaning means 62 includes a rinsing bath 63 supported by or placed relative to the support platform 12 such that the tip 48 can be placed in the rinsing bath 63. The rinsing bath 63 is filled with any well-known rinsing agent 64. The cleaning means 62 may further include agitation means 66 for agitating the rinsing agent 64. Preferably, the agitation means 66 includes a pair of ultrasonic pulse generators 67 mounted to opposite sides of the rinsing bath 63, but may include any well-known mechanical agitator (not shown).

Referring to FIG. 1 the machine 10 may further include a suitable light source 68 for illuminating the tip 48, which better enables the image processor 31 to detect the tip 48. When the probe 40 is a fiber-optic material, the light source 68 is preferably configured in a manner so as to emit light through the shaft 42 and tip 48.

Figure 6:
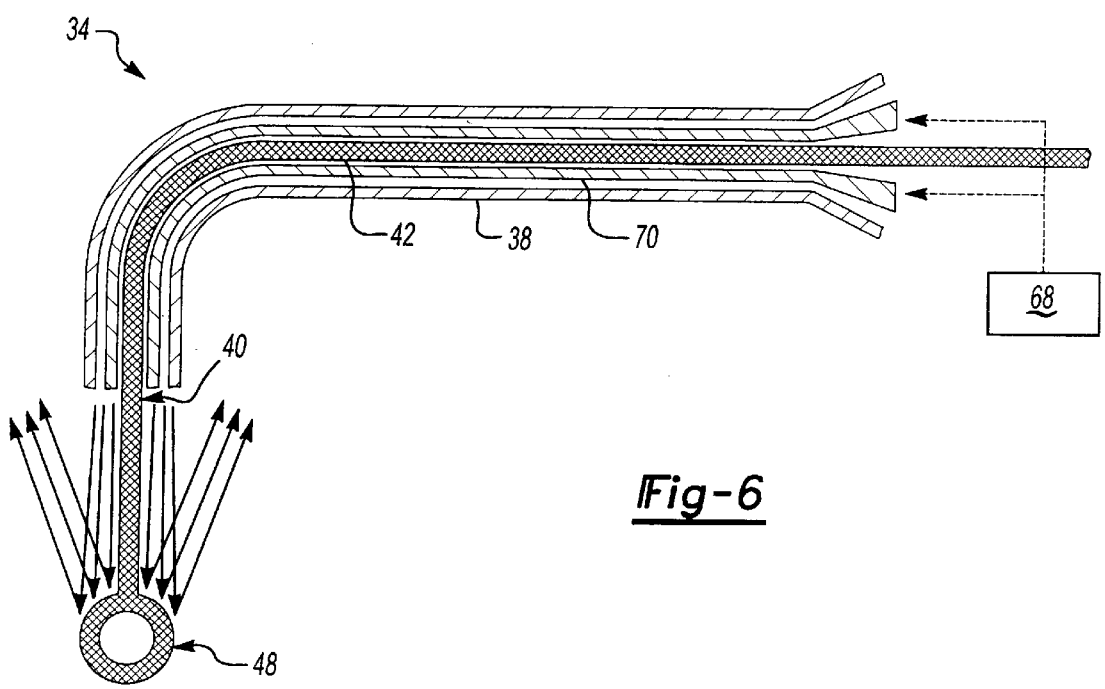
FIG. 6 is an enlaged sectional view of a portion of the probe assembly shown in FIG. 1 illustrating the relationship between the light source shown in FIG. 1 and assembly.

Referring to FIGS. 1 and 6, when the probe 40 is a non-fiber-optic material, the light source 68 is arranged in relationship to the guide tube 38 so as to emit light into an opening of the guide tube 38 adjacent the proximal end of the guide tube 38. Regarding this arrangement, the probe assembly 34 further includes a fiber-optic ring or sleeve 70 surrounding the portion of the shaft 42 disposed in the guide tube 38. In this arrangement, the light source 68 emits light that passes through the ring 70. The ring 70 in turn emits light on the tip 48. A possible advantage of making the probe 40 from a non-fiber-optic is that a material may be chosen which is less brittle and/or stronger than a fiber-optic material. Accordingly, the probe 40 may be less susceptible to breaking.

Referring to FIG. 1, the machine 10 further includes a control unit 72 connected to drive motors (not shown) for driving the movement of the cross-carrier 22, the carriage 28 and the spindles 30 and 32. The control unit 72 is also connected to the image processor 31, the cutting means 59, the heating means 58, the dislodging means 60 and the cleaning means 62 for controlling the various functions of each of these elements. The control unit 72 is of a well-known type. Preferably, the control unit 72 includes a computer (not shown). An input panel (not shown), a monitor (not shown), and a printer (not shown) are each connected to the computer.

In operation, the control unit 72 selectively actuates the drive motors connected to the cross-carrier 22, the carriage 28 and the probe spindle 32, which in turn cause the tip 48 to placed in contact with the given object. The control unit 72 then actuates the drive motor connected to the scanner spindle 30 so that the image processor 31 is properly focused on the tip 48. The coordinates of tip 48 are then computed by use of a best-fit algorithm. This process is may be repeated a number of times for a given object.

During the measurement of a given object, static attractive forces may build up between the tip 48 and the given object. In the event that the static force between the tip 48 and the given object become greater than the strength of the shaft 42, the shaft 42 will break upon attempting to separate the tip 48 from the given object. In order to counter act the build up of the static forces, compressed air is released after each measurement from the compressed air source 61 into the guide tube 38. The guide tube directs the air 38 across the top and along the sides of the tip 48 dislodging the tip 48 from the given object. By directing the air in this manner, the tip 48 can be separated from the given object without dragging the tip 48 along the given object. Thus, the build up of the static forces is controlled.

In addition to dislodging the tip 48 from the given object, the compressed air directed by the guide tube 38 also has the effect of removing dust or other particles from the tip 48. Thus, the accuracy of subsequent measurements can be maintained.

As an alternative to cleaning the tip 48 with compressed air, the tip 48 can be placed in the rinsing bath 62 by selective movement of the cross-carrier 22, carriage 28 and probe spindle 32. This operation may be programmed to occur as often as necessary. In addition, this operation may have the effect of reducing the build up of the static charge on the tip 48.

In the event that the tip 48 becomes damaged or breaks off the shaft 42, the probe 40 can be automatically repaired. The image processor 31 first signals the control unit 72 that the tip 48 cannot be properly focused. In turn, the control unit 72 commands the actuation of the cutting means 59. In turn, the cutting means 59 cuts the shaft 42 adjacent to the proximal end of the guide tube 38. The drive wheels 54, or the like, are commanded to advance the supply portion 44 of the shaft 42 a prescribed amount. The control unit 72 then selectively commands the drive motors connected to the cross-carrier 22, carriage 28 and probe spindle 32 to position the contact end portion 46 of the shaft 42 in a prescribed orientation with respect to the heating means 58. The heating means 58 is then automatically energized for a prescribed period of time, during which the contact end portion 46 is melted so as to form the tip 48.

As can be appreciated, the base 14 of the machine 10 can be arranged so as to be movable in addition to or in substitution to the movement of the cross-carrier 22, carriage 28 and/or one of the spindles 30, 32. In other words, the object 50, the cleaning means 66, the cutting means 59 and the heating means 58 can be moved to the probe 40 in combination with or in place of the probe 40 being moved.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A coordinate measuring machine for measuring an object comprising:

a support platform for supporting the object;

a probe supported by said support platform, said probe including a tip for contacting the object; and cleaning means proximate said support platform for cleaning said tip when not in contact with the object, said cleaning means selectively providing each of liquid and gaseous cleaning agents to said tip, said cleaning means including a compressed air source in fluid communication with said tip whereby particulate is removed from said tip by said gaseous cleaning agent as air is supplied from said compressed air source, said cleaning means further including a guide tube, said compressed air source being connected in fluid communication with one end of said guide tube, said probe being disposed in said guide tube with said tip extending from another end of said guide tube and said air exiting said guide tube from said another end.

2. A coordinate measuring machine for measuring an object comprising:

a support platform for supporting the object;

a probe supported by said support platform, said probe including a tip for contacting the object; and cleaning means proximate said support platform for cleaning said tip when not in contact with the object, said cleaning means selectively providing each of liquid and gaseous cleaning agents to said tip; and drive means connected to at least one of said probe and said cleaning means for moving said probe and said cleaning means relative to one another whereby said tip and said cleaning means are positioned proximate each other when cleaning said tip with said cleaning means.

3. The machine according to claim 2 wherein said cleaning means includes a rinsing bath having said liquid cleaning agent as a rinsing agent disposed in said rinsing bath, said probe and cleaning means being relatively positioned by said drive means to submerse said tip in said rinsing agent when cleaning said tip with said cleaning means.

4. The machine according to claim 3 wherein said cleaning means includes agitation means for agitating said rinsing agent.

5. A coordinate measuring machine for measuring an object comprising:

a support platform for supporting the object;

a probe supported by said support platform, said probe including a tip for contacting the object; and dislodging means proximate said tip for dislodging said tip from the object when said tip is attracted to the object by static attractive force, said dislodging means acting to dislodge said tip from contact with the object prior to moving said probe relative to the object.

6. The machine according to claim 5 wherein said dislodging means includes a compressed air source in fluid communication with said tip whereby dust and other particles are removed from said tip by compressed air supplied from said compressed air source.

7. The machine according to claim 6 wherein said dislodging means includes a guide tube supported by said support platform, said compressed air source being connected in fluid communication one end of said guide tube, said probe being disposed in said guide tube with said tip extending from another end of said guide tube whereby compressed air supplied by said compressed air source is fed through said guide tube and exits at said another end to flow across said tip.

* * * * *